(12) United States Patent
Carroll

(10) Patent No.: US 6,220,638 B1
(45) Date of Patent: Apr. 24, 2001

(54) CARRYING ASSEMBLY AND METHOD OF USE THEREOF

(76) Inventor: John Carroll, 29636 West Rd., New Boston, MI (US) 48164

( * ) Notice: Subject to any disclaimer, the term of this patent is extended or adjusted under 35 U.S.C. 154(b) by 0 days.

(21) Appl. No.: 09/482,245

(22) Filed: Jan. 13, 2000

(51) Int. Cl.[7] .................................................. B65G 7/12
(52) U.S. Cl. ........................................... 294/16; 294/102.1
(58) Field of Search ............................... 294/15, 16, 101, 294/102.1, 103.1, 104, 114, 164

(56) References Cited

U.S. PATENT DOCUMENTS

| | | | |
|---|---|---|---|
| 1,121,130 | * 12/1914 | Rafferty | 294/102.1 X |
| 2,549,918 | * 4/1951 | Miller | 294/104 |
| 2,776,856 | * 1/1957 | Ingram | 294/16 |
| 3,150,895 | * 9/1964 | Lebre | 294/16 |
| 3,524,670 | * 8/1970 | Ilich | 294/16 X |
| 4,174,060 | * 11/1979 | Porat | 294/102.1 X |
| 4,349,225 | 9/1982 | Collins et al. . | |
| 5,226,688 | 7/1993 | Russo et al. . | |
| 5,685,585 | 11/1997 | Wulff . | |

FOREIGN PATENT DOCUMENTS

2254282 * 10/1992 (GB) ............................. 294/102.1

* cited by examiner

Primary Examiner—Johnny D. Cherry
(74) Attorney, Agent, or Firm—Chupa & Alberti, P.C.

(57) ABSTRACT

A carrying assembly for carrying and/or transporting planar objects is disclosed. The carrying assembly includes a handle with a cross member, a support member and a support assembly which secures a planar object within the carrying assembly.

16 Claims, 4 Drawing Sheets

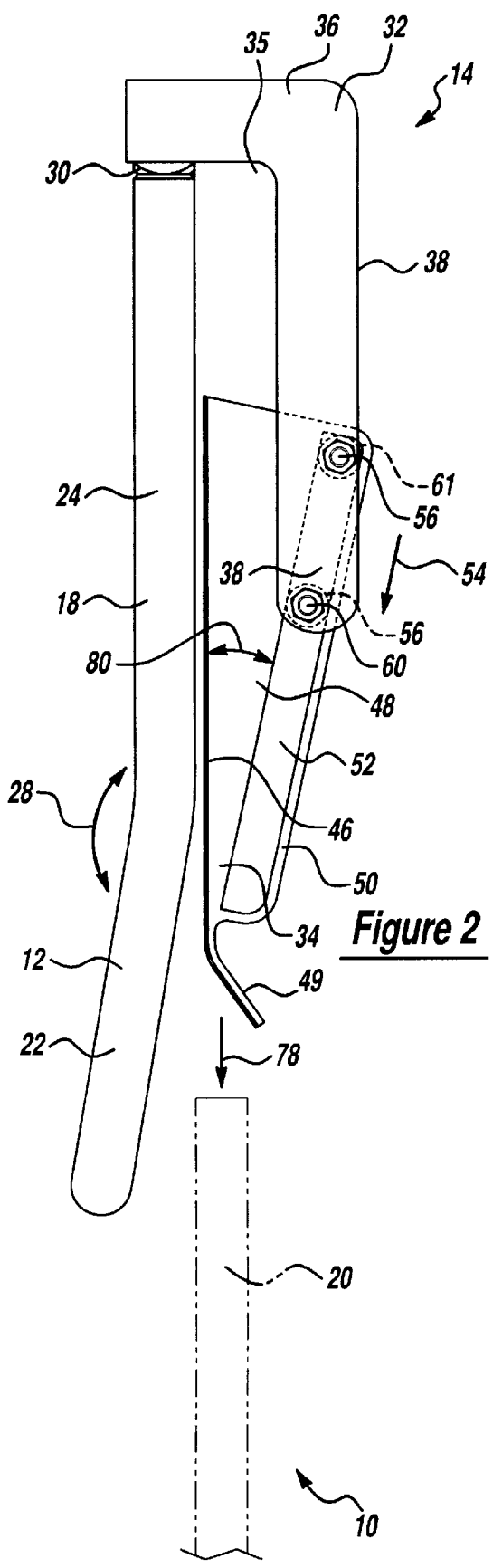
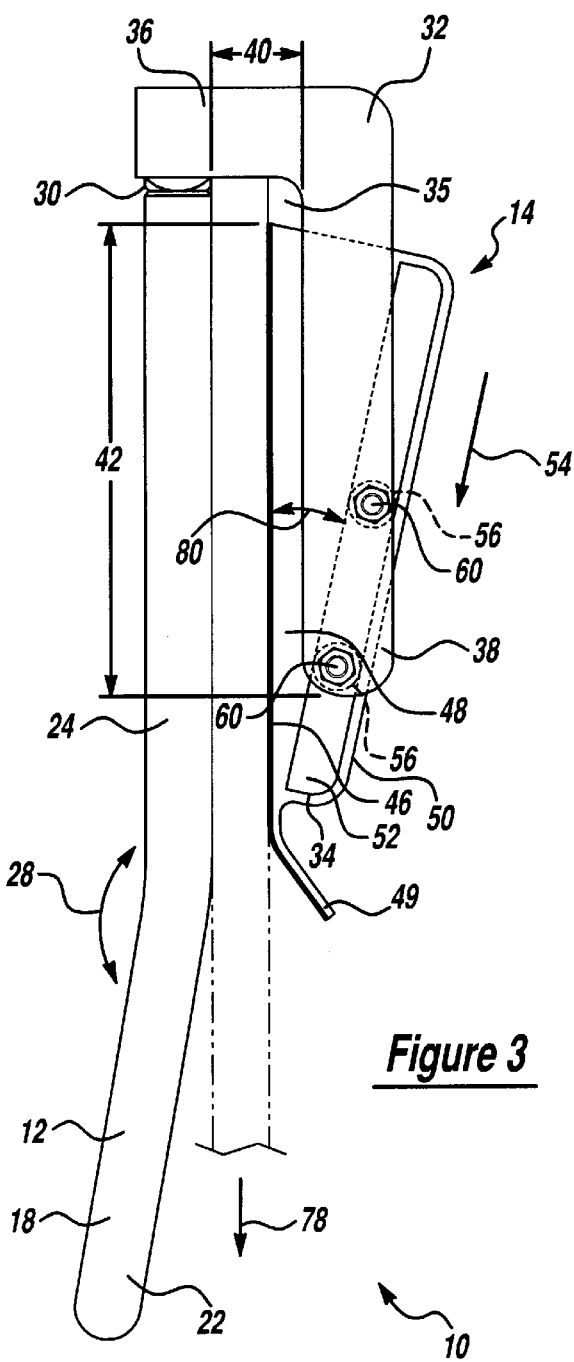
*Figure 2*
*Figure 3*

… …

CARRYING ASSEMBLY AND METHOD OF USE THEREOF

FIELD OF THE INVENTION

The present invention relates to a carrying assembly for carrying planar objects (i.e., an object with planar surfaces which are relatively large when compared with the remaining portions and/or surfaces of the object) and/or sheet materials and more specifically to a carrying assembly which can carry planar objects, especially drywall, plywood and/or sheetstock of varying widths and/or thicknesses.

BACKGROUND OF THE INVENTION

In a variety of fields and more particularly and importantly in the construction field, there exist a variety of planar objects (e.g., siding, plywood, window panes and drywall layers) which must be frequently moved and/or transported from one location to another. These planar objects present difficulties to a person who manually tries to transport and/or move them. Planar objects typically do not have areas and or portions which are amenable to gripping by a human hand. A person attempting to manually transport a planar object such as drywall must often assume both awkward bodily positions and strenuous hand positions to move and/or transport the planar object. These awkward bodily positions and strenuous hand positions can injure the person moving the planar object and, further, that person runs the risk of dropping and/or damaging such planar object. Consequently, there exists a need for carrying devices and/or assemblies which allow a person to more simply and efficiently carry one or more planar objects without having to assume strenuous bodily positions.

Although prior carrying assemblies have been designed to carry planar objects, these prior assemblies suffer from drawbacks. Particularly, prior art assemblies have been designed such that only very limited surface area of the carrying assembly actually contacts the planar object that is being transported and/or carried. These limited contact areas must support the entire planar objects that are being transported and, therefore, substantial pressure must be applied to these limited contact areas to secure the carrying assembly to the planar object. The pressure applied may damage the planar object especially if the planar object is made of materials that are less resistant to force and/or pressure, for example and without limitation, those materials that compose commercially available and conventional drywall or gypsum board.

Furthermore, planar objects come in a variety of thicknesses (i.e., those distances between two planar surfaces of one planar object) which must be accommodated by the carrying assembly used to carry and/or transport a particular planar object. Consequently, a carrying device must easily and/or automatically adjust so that a user of a particular carrying device can quickly and efficiently lift and/or elevate planar objects which have varying widths.

There is therefore a need for a carrying assembly which supports a planar object and/or sheet material, wherein the assembly contacts a large surface area of the planar object, wherein the carrying assembly can accommodate planar objects having a variety of thicknesses and wherein the user of the carrying device is not subject to strenuous bodily positions when using the device.

SUMMARY OF THE INVENTION

It is an object of the present invention to provide a carrying assembly for carrying and/or transporting planar objects in a manner that effectively and safely secures the planar objects within the carrying assembly and allows the planar objects to be carried without substantially damaging the objects or placing undue stress on the user of the carrying assembly.

According to a first aspect of the present invention, there is provided a carrying assembly for transporting a planar object which has at least two planar surfaces and a width between the planar surfaces. The carrying assembly comprises a handle portion having a cross member from which extends a first support member and a first support assembly which is attached to the first support member. The first support assembly includes a first bracket and a first gripping member, the first gripping member being selectively and operatively movable in relation to the bracket such that the planar object may be received between the first gripping member and the first support member.

According to a second aspect of the present invention there is provided a method for a user to use a carrying assembly. The user has an arm, a hand and a body. The carrying assembly has a cross member, a first and second support member attached to the cross member and a first and second support assembly attached to the first and second support members, the first and second support assemblies including a first and second bracket and a first and second gripping member. The method comprises the steps of: providing the carrying assembly; contacting a planar object with the first and second gripping members such that the planar object is received between the first support member and the first gripping member and such that the planar object is received between the second support member and the second gripping member; and elevating the planar object while maintaining the planar object between the arm and the body of the user.

These and other objects, aspects, and advantages of the present invention will become apparent upon reading the following detailed description in combination with the accompanying drawings.

BRIEF DESCRIPTION OF THE DRAWINGS

FIG. 2 is a side view of the carrying assembly illustrated in FIG. 1;

FIG. 3 is a side view of the carrying assembly illustrated in FIG. 1; and

DETAILED DESCRIPTION OF THE PREFERRED EMBODIMENT OF THE INVENTION

Figure 1:
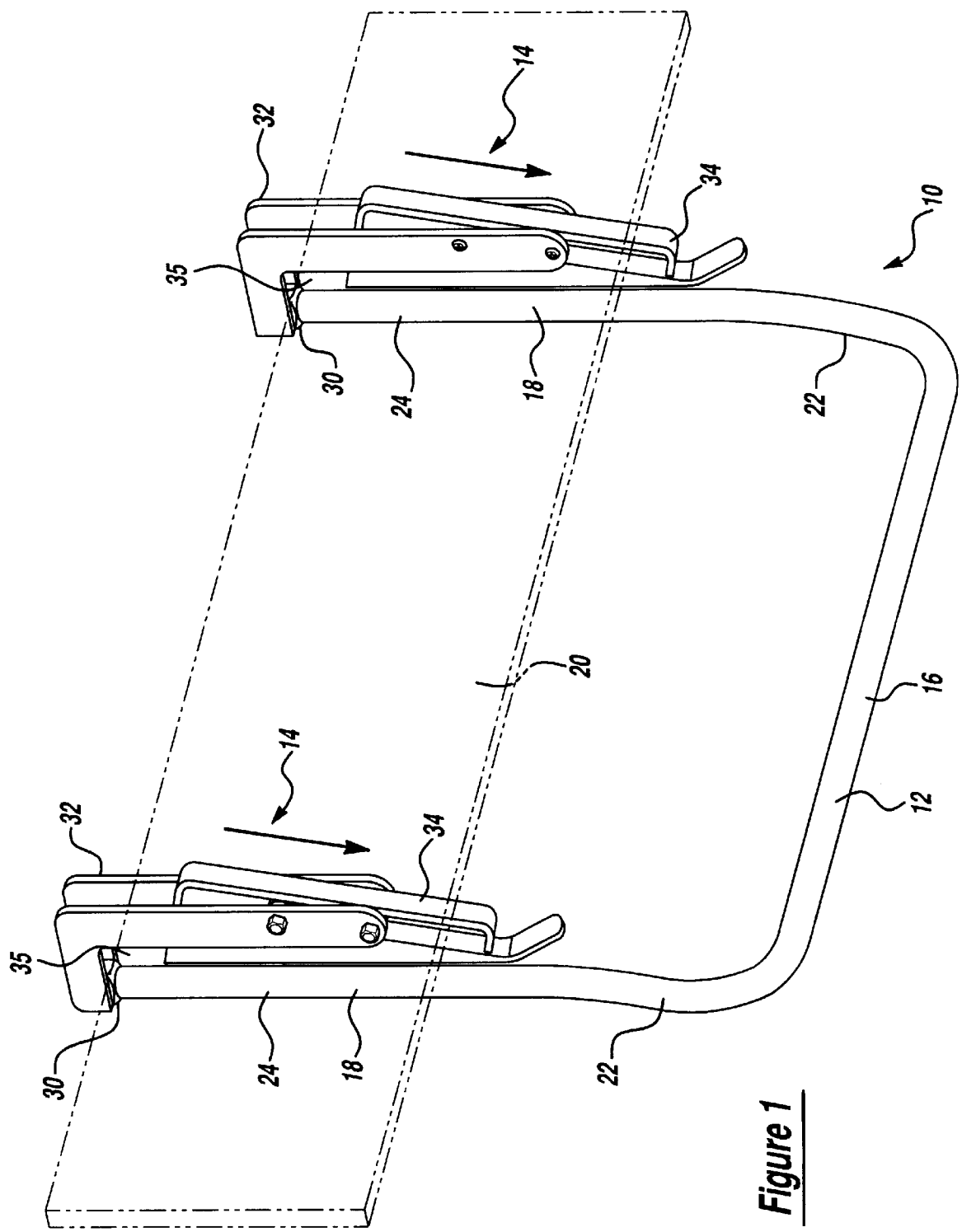
FIG. 1 is a perspective view of a carrying assembly formed in accordance with the teachings of a preferred embodiment of the invention.

Referring now to FIGS. 1–4, there is shown a carrying assembly 10 in accordance with the teachings of the preferred embodiment of the present invention. Carrying assembly 10 includes a handle 12 and two support assemblies 14.

Handle 12 includes a cross member 16 and two support members 18 extending from cross member 16. In the non-limiting embodiment shown of FIG. 1, cross member 16 is elongated and has a generally cylindrical or tubular cross section and extends generally longitudinally. Cross member 16 is made and/or manufactured from a rigid material (e.g., plastic or metal) and is capable of supporting at least one or more planar objects 20 (e.g., drywall panels, plywood and/or sheet stock).

Support members 18 are attached to, connected to and/or integrally formed with cross member 16 in a known and conventional manner. In a non-limiting embodiment of the present invention, support members 18 include lower portions and/or members 22 and upper portions and/or members 24. Lower portions 22 extend generally laterally and are perpendicular to cross member 16. Upper portions 24 also extend generally laterally and are also perpendicular to cross member 16. Furthermore, lower portions 22 are attached to, connected to and/or integrally formed with upper portions 24, and lower portions 22 form an angle 28 of from about one hundred sixty five to about one hundred eighty five degrees with upper portions 24.

In the preferred embodiment, each upper portion and/or member 24 is attached to, connected to and/or integrally formed with a connection member and/or portion 30. Each connection member 30 includes a first and second flat portion which are on opposing sides of connection members 30, and each connection member 30 may include two apertures (e.g. screw holes) which extend from the first flat portion to the second flat portion of a given connection member 30.

In the preferred embodiment, connection members 30 are attached, connected and/or coupled to support assemblies 14. Support assemblies 14 include brackets 32 (e.g., a conventional metal bracket) and gripping portions or members 34 which are selectively slidable and/or movable in relation to brackets 32. Also, in the preferred embodiment, brackets 32 are attached and/or connected to (e.g., screwed onto and/or welded onto) connection members 30 in a conventional manner. In one embodiment, brackets 32 are attached to members 30 using conventional screws which extend through apertures (e.g., screw holes) in bracket 32 and through the apertures (e.g., screw holes) in connection members 30. In another embodiment, brackets 32 are attached to members 30 by spot welding.

Furthermore, in the preferred embodiment, brackets 32 are generally L-shaped and form open portions and/or channels 35 with said support members 18. Open portions 35 are suitable for receiving items (e.g., planar objects and/or drywall panels). Specifically, each bracket 32 includes an upper portion 36 and a lower portion 38. Upper portion 36 extends outwardly from support member 18 in a direction substantially perpendicular to support member 18 and lower portion 38 extends outwardly from upper portion 36 in a direction which is substantially parallel to support member 18 such that open portion or channel 35 is created. Channels or open portions 35 are generally elongated with a width 40 and a length 42, and are suitable for receiving items (e.g., planar objects and/or drywall panels.)

Carrying assembly 10 and, specifically, support assemblies 14 also include gripping members and/or portions 34. In the preferred embodiment, gripping member 34 includes gripping and/or securing surface 46, body portion 48, lip portion 49 and "bridge" and/or guide portion 50. Gripping members 34 are selectively and/or operatively attached, connected and/or coupled to brackets 32. In the preferred embodiment, bridge or guide portion 50 and body portion 48 cooperatively form an open portion and/or guide track 52 which is elongated and extends in a direction 54, wherein direction 54 extends at least partially toward handle 12.

Figure 4:
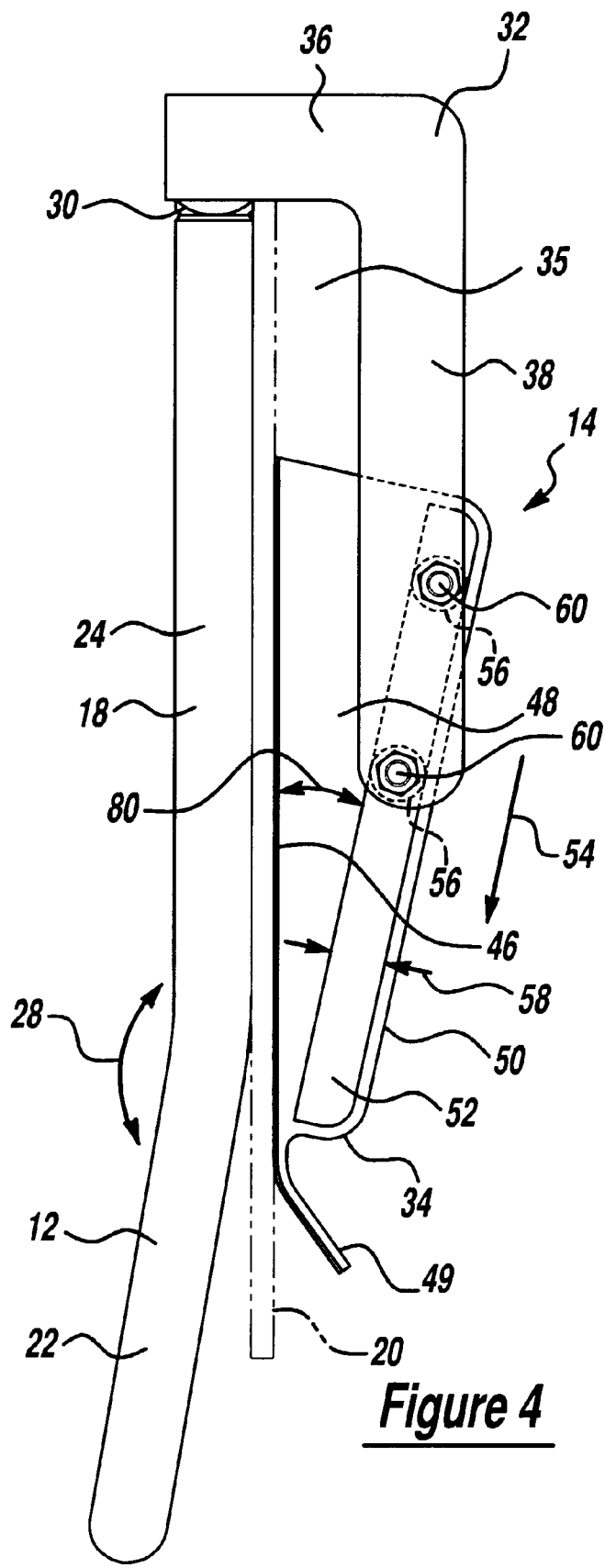
FIG. 4 is a side view of the carrying assembly illustrated in FIG. 1.

Disposed within guide track 52 are guide members 56 (e.g., dowels, bushings and/or rollers) which are shown in phantom in FIGS. 2–4. Guide members 56 are substantially cylindrical each with a circular cross-section that has a diameter slightly less than a width 58 of guide track 52. Further, guide members 56 have apertures through which conventional attachment devices 60 (e.g., a screw, a nut and bolt assembly, a pin and clip assembly, or a wing nut and bolt assembly) may extend. In the preferred embodiment, the attachment devices 60 are further attached, connected and/or coupled and supported by bracket 32 which has apertures which correspond to the apertures in the guide members 56. Specifically, the attachment devices 60 extend through the apertures of bracket 32 and through the apertures in guide members 56 and operatively attach guide members 56 to bracket 32 while still allowing guide members 56 to rotate about attachment devices 60.

In addition, and referring to a non-limiting embodiment of the invention, body portion 48 of gripping member 34 is generally made of relatively heavy material (e.g., steel). Further, body portion 48 is generally triangular shaped when viewed from the side and includes one side and/or surface which is substantially comprised of and/or defined by gripping surface 46 and another side which is comprised of and/or generally defined by at least a portion of guide track 52. Body portion 48 is also attached to and/or integrally formed with lip portion 49. Lip 49 is designed to help assembly 10 receive planar object 20.

Further, in the preferred embodiment, gripping surface 46 may be made of soft and or cushion material (e.g. rubber) which is attached and/or coupled in a conventional manner to body portion 48 of gripping member 34. However, in an alternative embodiment, gripping surface 46 may be the surface of gripping member 34 without an additional coating of cushion material.

Figure 5:
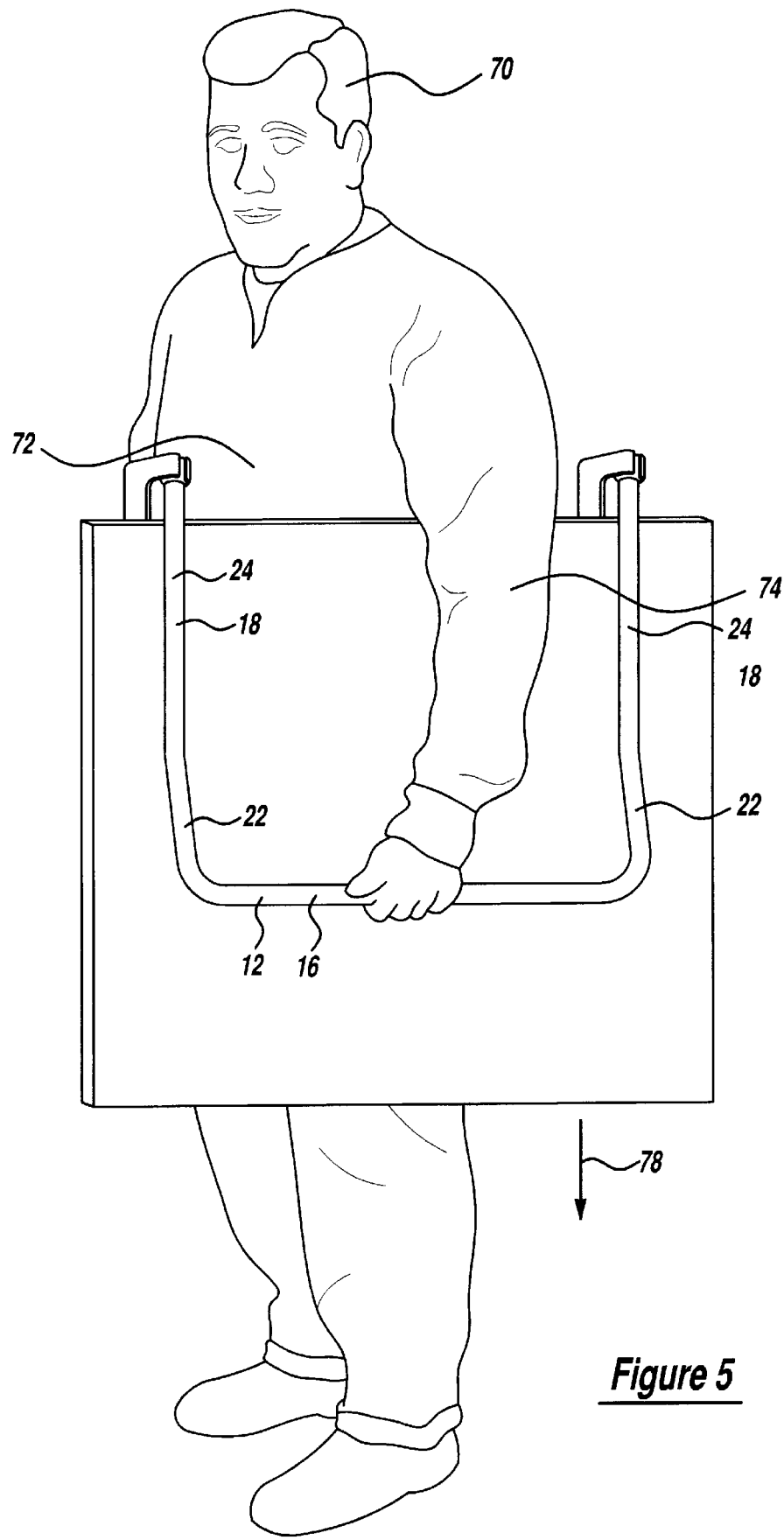
FIG. 5 is a perspective view of a person using the carrying assembly of FIG. 1.

The method of using carrying assembly 10 is best illustrated in FIGS. 2–3, and 5. In the non-limiting embodiment illustrated in FIG. 2 the carrying assembly 10 is in a "closed" and/or "relaxed" position (i.e., the gripping surface 46 of the gripping member 34 is relatively close to and/or in abutment with handle 12 over, adjacent and/or above planar object 20 (e.g., drywall)). Carrying assembly 10 naturally assumes this "closed" position because gravity pulls gripping member 34 in a direction 78; however, guide track 52 "guides" and/or only allows gripping member 34 to travel in direction 54 such that gripping member 34 is relatively close to and/or in abutment with upper portions 24 of handle 12. Once the carrying assembly 10 is in the closed position, a user of carrying assembly 10 may bring and/or place planar object 20 against receiving lip 49 and/or bring and/or place receiving lip 49 against planar object 20 such that forces between lip 49 and planar object 20 move gripping member 34 away from upper portions 24 of handle 12 along guide track 52 in a direction opposite direction 54. In this manner, gripping member 34 is moved away from handle 12 in order to open channel and/or open portion 35 just enough to receive planar object 20 between upper portions 24 and gripping members 34, and as best seen in FIG. 3, planar object 20 becomes inserted, locked and/or received within channel 35.

Once object 20 is locked in position, as best shown in FIG. 5, a user 70 of carrying assembly 10 may lift and/or elevate planar object 20 by gripping handle 12 to elevate assembly 10 which, in turn, elevates planar object 20 in a manner that allows planar object 20 to reside in between a body 72 of user 70 and an arm 74 and/or hand of user 70.

Referring specifically to the non-limiting embodiment illustrated in FIGS. 3 and 5, the present invention is particularly advantageous in the fact that the triangular body 48 of gripping member 34 disposes the guide track 52 at an angle 80 (e.g., approximately 10 to 20 degrees) with respect to the gripping surface 46 and/or upper portions 24 of handle 12. Because guide track 52 is disposed at angle 80, planar object 20 become substantially locked in channel 35. Forces (e.g., gravitational forces) that are placed upon planar object 20 in direction 78 away from channel 35 are typically unable to remove object 20 from channel 35. Forces in direction 78 create frictional forces between object 20 and gripping surface 46 which, in turn, tend to move gripping members 34 in direction 78. However, guide track 52 will only allow gripping members 34 to move in direction 54 toward handle 12. Consequently, if greater force is placed on object 20 in direction 78, a corresponding force is placed upon gripping member 34 in direction 54 and, consequently, gripping member 34 "locks" object 20 tighter against handle 12 and/or tighter within channel 35.

Another particular advantage of the present invention, as best seen in FIGS. 2 and 4, is that a substantial portion of gripping surface 46 contacts and operatively holds planar object 20 in a fixed position, thus supporting planar object 20 in a manner which is unlikely to cause damage to it.

A further advantage which can be seen in FIGS. 2 and 3 is that at least a portion and/or the greater portion of gripping surfaces 46 remains substantially parallel to at least a portion of support members 18 as gripping members 34 are moved away from support members 18 such that a planar object 20, especially sheet material such as drywall, of varying widths can slide into channel 35 and become automatically locked within channel 35 by a large portion of gripping surface 46. In other words, when assembly 10 is properly utilized, gripping members 34 only move in a direction opposite direction 54 far enough to allow the width and/or thickness of planar object 20 to fit between gripping members 34 and upper portions 24 of handle 12, and gripping members 34 automatically "clamp" planar object 20 against upper portion 24 of handle 12.

It should be understood that the invention is not limited to the exact embodiment or construction which has been illustrated and described but that various changes may be made without departing from the spirit and the scope of the invention.

What is claimed is:

1. A carrying assembly for transporting a planar object which has at least two planar surfaces and a width between said planar surfaces, said assembly comprising:
    a handle portion having a cross member from which extends a first support member;
    a first support assembly attached to said first support member wherein said first support member and said first support assembly form an open, generally U-shaped frame, said first support assembly including a first bracket and a first gripping member, said first gripping member being selectively, slidably, and operatively movable in relation to said bracket such that said planar object may be received between said first gripping member and said first support member.

2. A carrying assembly as in claim 1 further including a second support member attached to a second support assembly wherein said second support member and said second support assembly form an open, generally U-shaped frame, said second support assembly including a second bracket and a second gripping member, said second gripping member being selectively, slidably, and operatively movable in relation to said second bracket such that said planar object may be received between said second gripping member and said second support member.

3. A carrying assembly as in claim 2, wherein said first and second gripping members are selectively movable in a direction toward and a direction away from said first and second support members.

4. A carrying assembly as in claim 3 wherein said first and second gripping members move away from said first and second support members to accommodate the width of said planar object.

5. A carrying assembly as in claim 4 wherein said first and second gripping members include a first and second lip portion that assists said gripping members to move away from said first and second support members and thereby accommodate the width of said planar object.

6. A carrying assembly as in claim 3, wherein said first and said second gripping members include a first and second guide track which is disposed at an angle in relation to said first and second support members and which said first and second gripping members may be moved along.

7. A carrying assembly as in claim 6 wherein said angle is between ten and twenty degrees.

8. A carrying assembly as in claim 6, further including guide members which are operatively placed in a manner that allows said guide members to move along said first and second guide tracks.

9. A carrying assembly as in claim 8, wherein said guide members are bushings.

10. A carrying assembly as in claim 8 wherein said guide members comprise first and second guide members that are operatively attached to attachment devices which are connected to said first and second brackets.

11. A carrying assembly as in claim 10 wherein said attachment devices are nut and bolt assemblies.

12. A carrying assembly as in claim 2 wherein said first and second gripping members include a first and second gripping surface which remain substantially parallel to at least a portion of said first and second support members when said first and second gripping members are moved.

13. A carrying assembly as in claim 2 wherein said first and second brackets include a first and second upper portion respectively which are substantially perpendicular to said first and second support members and a first and second lower portion respectively which are substantially parallel to said first and second support members, wherein said first and second brackets form open portions into which said planar object is received.

14. A method for a user to use a carrying assembly, said user having an arm, a hand and a body, said carrying assembly having a cross member, a first and second support member attached to said cross member and a first and second support assembly attached to said first and second support members, said first and second support assemblies including a first and second bracket and a first and second gripping member, said method comprising the steps of:
    providing said carrying assembly;
    contacting a planar object with said first and second gripping members such that said planar object is received between said first support member and said first gripping member and such that said planar object is received between said second support member and said second gripping member; and
    elevating said planar object while maintaining said planar object between said arm and said body of said user.

15. A method as in claim 14 wherein said first and second gripping members move to accommodate the width of said planar object during said contacting step.

16. A method as in claim 14 wherein said first and said second gripping members include a first and second guide track which is disposed at an angle in relation to said first and second support members and which said first and second gripping members may be moved along, said method further comprising the step of: adjusting said first and second gripping members to account for a thickness of said planar object by sliding said first and second gripping members along said first and second guide members.

* * * * *